US012559253B2

(12) United States Patent
Dowdell et al.

(10) Patent No.: US 12,559,253 B2
(45) Date of Patent: Feb. 24, 2026

(54) TELESCOPING SECONDARY BARRIER SYSTEM

(71) Applicant: The Boeing Company, Arlington, VA (US)

(72) Inventors: Robert Dowdell, Everett, WA (US); Emmanuel A. Garcia, Mukilteo, WA (US); Christopher B. Singleton, Bothell, WA (US); Joshua Yu-Hu Lee, Seattle, WA (US)

(73) Assignee: THE BOEING COMPANY, Arlington, VA (US)

( * ) Notice: Subject to any disclaimer, the term of this patent is extended or adjusted under 35 U.S.C. 154(b) by 0 days.

(21) Appl. No.: 18/295,361

(22) Filed: Apr. 4, 2023

(65) Prior Publication Data

US 2024/0336370 A1     Oct. 10, 2024

(51) Int. Cl.
*B64D 45/00* (2006.01)
*B64D 11/00* (2006.01)

(52) U.S. Cl.
CPC ...... *B64D 45/0026* (2019.08); *B64D 11/0023* (2013.01)

(58) Field of Classification Search
CPC ............ B64D 45/0026; B64D 45/0028; B64D 11/0023; B64C 1/1469
See application file for complete search history.

(56) References Cited

U.S. PATENT DOCUMENTS

| | | | | |
|---|---|---|---|---|
| 1,248,755 A | * | 12/1917 | Tomkinson | E05D 13/145 |
| | | | | 160/202 |
| 1,682,772 A | * | 9/1928 | Cahill | E06B 9/0676 |
| | | | | 160/211 |
| 3,423,121 A | * | 1/1969 | Lipkin | B64D 11/0023 |
| | | | | 160/35 |
| 6,257,523 B1 | * | 7/2001 | Olliges | B64D 11/0023 |
| | | | | 160/84.04 |
| 6,588,705 B1 | | 7/2003 | Frank | |

(Continued)

FOREIGN PATENT DOCUMENTS

| | | |
|---|---|---|
| EP | 2392754 A1 | 12/2011 |
| EP | 3524509 B1 | 10/2020 |
| EP | 3568559 B1 | 9/2021 |

*Primary Examiner* — Richard Green
(74) *Attorney, Agent, or Firm* — COATS & BENNETT, PLLC

(57) ABSTRACT

A secondary barrier system for an aircraft includes a secondary barrier gate including a telescoping structure is disclosed. The secondary barrier gate may include a plurality of crossmembers, and at least one of the plurality of crossmembers may include a panel treatment. The secondary barrier gate is rotatable between a stowed position and a deployed position and extendable between a retracted length and an extended length. The secondary barrier gate is securable in the stowed position and the deployed position. The secondary barrier gate may be rotatably mounted to a ceiling or within a crown area of the aircraft. The secondary barrier system may also include a stowage latch actuatable to selectively release and/or secure the secondary barrier gate from/in a stowed position and a deployment latch actuatable to selectively release and/or secure the secondary barrier gate from/in one of a retracted length or an extended length.

20 Claims, 7 Drawing Sheets

(56)                    References Cited

U.S. PATENT DOCUMENTS

| | | | | |
|---|---|---|---|---|
| 6,783,098 | B1 * | 8/2004 | Chavez ............. | B64D 45/0028 |
| | | | | 244/118.5 |
| 7,744,035 | B2 * | 6/2010 | Saint-Jalmes ........ | B64C 1/1415 |
| | | | | 49/360 |
| 9,222,264 | B1 * | 12/2015 | Reid ..................... | E06B 9/0676 |
| 11,345,476 | B2 * | 5/2022 | Dowty ................. | B64C 1/1484 |
| 2003/0127562 | A1 | 7/2003 | Pereira et al. | |
| 2006/0000946 | A1 | 1/2006 | Garofani et al. | |
| 2022/0355949 | A1 | 11/2022 | Reinck et al. | |
| 2024/0199209 | A1 * | 6/2024 | Chung ............. | B64D 11/0023 |

* cited by examiner

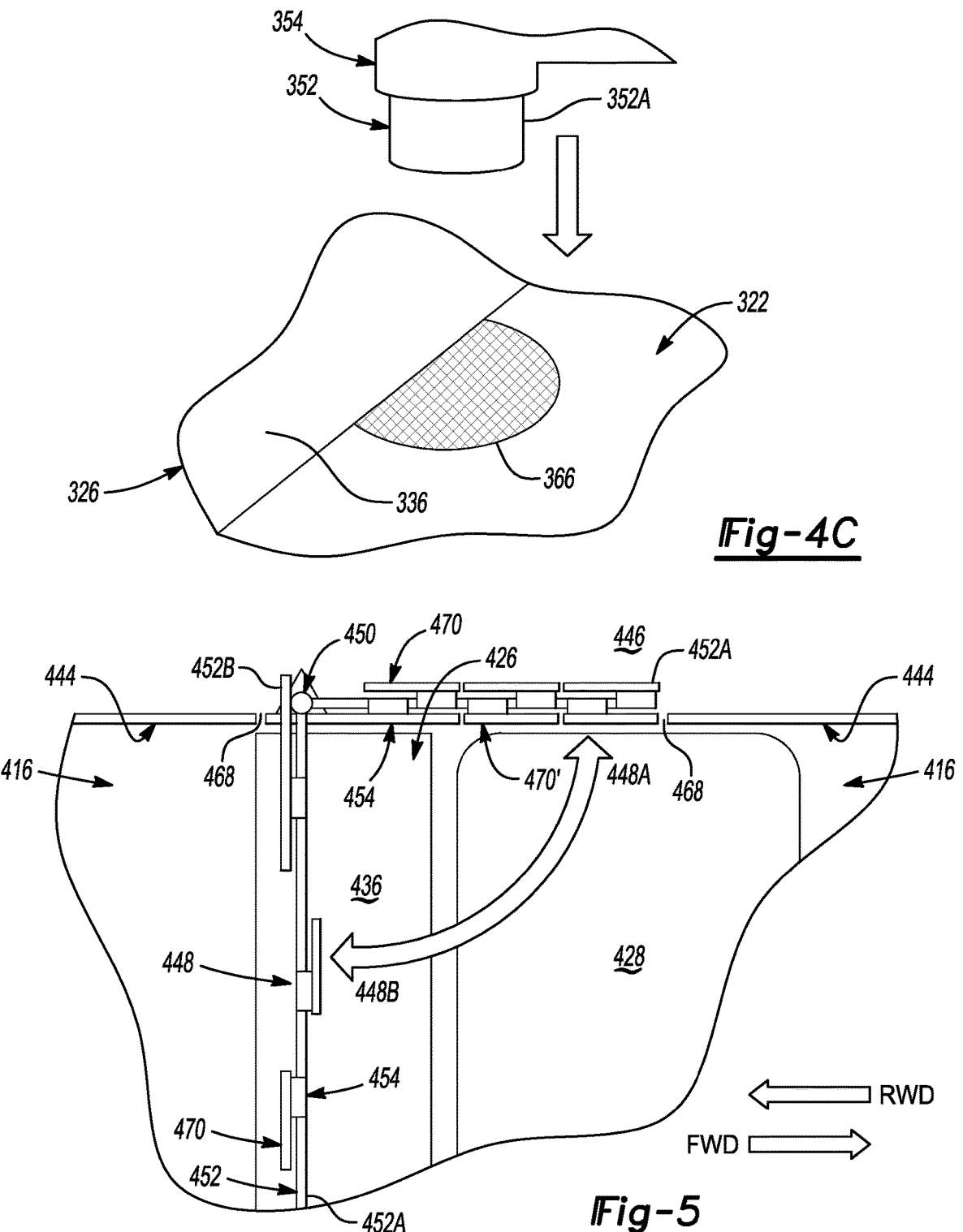
_Fig-4C_
_Fig-5_

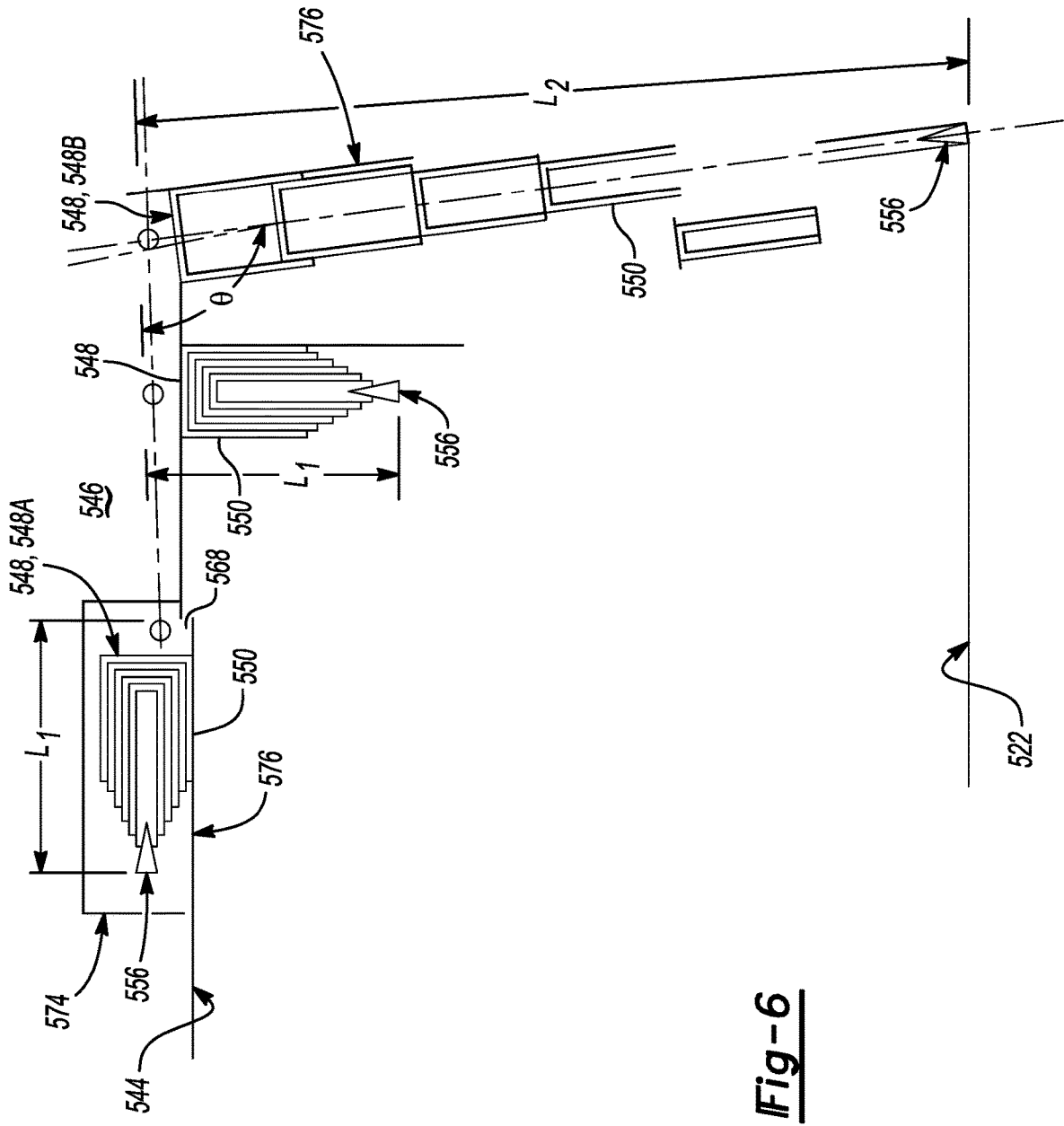
_Fig-6_

TELESCOPING SECONDARY BARRIER SYSTEM

TECHNICAL FIELD

The present disclosure generally relates to barrier gates and, more particularly, to a secondary barrier system, including a secondary barrier gate, employed to block access to a flight deck of an aircraft during opening and closing of a flight deck door, while an aircraft is in flight.

BACKGROUND

Aircraft includes a flight deck door that may be reinforced to be protective, providing, for example, anti-intrusion/anti-penetration features. During flight, the flight crew members must open the flight deck door, for example, to access lavatory facilities, to transfer meals to flight crew members, or to switch crew positions for crew rest purposes. The opening and closing of the flight deck door or "door transition" may reduce the protective anti-intrusion/anti-penetration benefits of the reinforced door. Accordingly, during a door transition, the flight deck may be vulnerable.

The Federal Aviation Administration (FAA) issues Advisory Circulars (ACs), which, while not mandatory, describe acceptable means, but not the only means, to comply with mandatory regulatory requirements, for example, those governing flight deck security procedures. FAA AC-120-110, for example, in part, provides guidance with respect to Aircraft Secondary Barrier and Alternate Flight Deck Security.

In general, passenger air carriers employ three basic methods to support security of the flight deck during door transitions including: 1) a human barrier method, which includes employing a crew member or crew members to monitor the area in front of the flight deck door and block access to the flight deck during a door transition; 2) a combined human and equipment barrier method, which includes employing a crew member or crew members to monitor the area in front of the flight deck and using aircraft equipment, for example but not limited to, a galley cart, to block access to the flight deck during a door transition; and 3) a secondary barrier method, which includes providing a secondary barrier that may be deployed between the flight deck and the passenger cabin of the aircraft during a door transition.

SUMMARY

It is therefore useful to develop a secondary barrier system that may be predictably and reliably deployed to protect the flight deck of an aircraft during a door transition, and stowed, within an aircraft, in a location that minimizes impact on aisle width, monument size, and cabin space, when not in use.

It is also useful to develop a secondary barrier system that allows manufacturers to include the secondary barrier system in newly manufactured aircrafts, while providing manufactures and/or third parties, for example, retrofit companies, the ability to retrofit existing aircraft to include the secondary barrier system, thereby saving time and minimizing costs.

In one aspect of the present disclosure, a secondary barrier system for an aircraft includes a secondary barrier gate including a telescoping structure. The secondary barrier gate is rotatable between a stowed position and a deployed position and extendable between a retracted length and an extended length.

The telescoping structure includes a first telescoping leg, a second telescoping leg, and a plurality of crossmembers extending between the first telescoping leg and the second telescoping leg. At least one of the first and second telescoping legs includes a foot portion.

The secondary barrier gate includes at least one intermediate position between the stowed position and the deployed position. The secondary barrier gate has a retracted length, when the secondary barrier gate is in at least one of the stowed position and the at least one intermediate position, and an extended length, when the secondary barrier gate is in the deployed position.

The secondary barrier gate may be rotatably mounted to a ceiling of the aircraft.

Alternatively, the secondary barrier gate may be rotatably mounted within a crown area of the aircraft, or disposed in a stowage box that is located within a crown area of the aircraft.

The secondary barrier gate may be substantially parallel to, for example, an axis of the aircraft or a floor of the aircraft, when the secondary barrier gate is in the stowage position.

The secondary barrier gate may be substantially perpendicular to, for example, an axis of the aircraft or a floor of the aircraft, when the secondary barrier gate is in the deployed position.

The first telescoping leg of the telescoping structure may be adjacent a first monument wall and the second telescoping leg of the telescoping structure may be adjacent a second monument wall, when the secondary barrier gate is in the deployed position.

The foot portion may include a compressible foot pad that, when compressed, secures the secondary barrier gate in the deployed position.

In one embodiment according to the present disclosure, the secondary barrier system may further include a monument cutout. The foot portion may include a pivot foot that may be rotatable between a first position and a second position, such that when the pivot foot is rotated to the second position, the pivot foot engages with the monument cutout to secure the secondary barrier gate in the deployed position.

Alternatively, the secondary barrier system may further include a stabilizer block having a stabilizer block cutout. The foot portion may include a fixed foot that may be engageable with the stabilizer block cutout, such that when the fixed foot engages with the stabilizer block cutout, the secondary barrier gate is secured in the deployed position. The stabilizer block may be mounted to, for example but not limited to, a monument, a floor of the aircraft, and/or both the monument and the floor of the aircraft.

Alternatively, a floor of the aircraft may define at least one opening. The foot portion may include a fixed foot that may be engageable with the at least one opening, such that, when the fixed foot is engaged with the at least one opening, the secondary barrier gate is secured in the deployed position.

A stowage latch actuatable between a stowed position and a released position is also disclosed. The stowage latch may be actuated to selectively release the secondary barrier gate from the stowage position and secure the secondary barrier gate in the stowage position.

A deployment latch actuatable between a retracted position and a deployed position is also disclosed. The deployment latch may be actuated to selectively release the secondary barrier gate from one of a retracted length or an extended length, and/or secure the secondary barrier gate at one of the retracted length or the extended length.

At least one of the plurality of crossmembers may include a panel treatment.

In one aspect of the disclosure, a secondary barrier system for an aircraft includes a secondary barrier gate including a telescoping structure having a first telescoping leg, a second telescoping leg, a plurality of crossmembers extending between the first telescoping leg and the second telescoping leg, and a securing structure. The secondary barrier gate may be rotatable between a stowed position and a deployed position, and the telescoping structure may be extendable between a retracted position and an extended position, such that the telescoping structure may be in the retracted position when in the secondary barrier gate is in the stowed position, and telescoping structure may be in the extended position when the secondary barrier gate is in the deployed position. The securing structure may secure the secondary barrier gate in the deployed position when the telescoping structure is in the extended position.

Accordingly, the presently disclosed secondary barrier system provides a secondary barrier gate that may be deployed and secured in a deployed position between the flight deck and the main cabin of the aircraft during a door transition, and retracted and stowed when not in use. As the presently disclosed secondary barrier system is stowable within a ceiling of an aircraft, impact on aisle width, monument size, and cabin space is minimized.

The presently disclosed secondary barrier system also allows manufacturers to include the secondary barrier system in newly manufactured aircrafts, while providing manufactures and/or third parties, for example, retrofit companies, the ability to retrofit existing aircraft to include the secondary barrier system. In doing so, the manufacturers or retrofit companies may save time and minimize costs.

The above features and advantages and other features and advantages of the present teachings are readily apparent from the following detailed description of the modes for carrying out the present teachings when taken in connection with the accompanying drawings.

BRIEF DESCRIPTION OF THE DRAWINGS

The accompanying drawings, which are incorporated into and constitute a part of this specification, illustrate implementations of the disclosure and, together with the description, serve to explain the principles of the disclosure.

FIG. 4C is a schematic exploded view illustration of a portion of a secondary barrier system encircled at C in FIG. 2, according to another embodiment of the present disclosure.

FIG. 5 is a schematic side view illustration through section B-B of FIG. 1 including a side view of a secondary barrier system including crossmembers having panel treatments.

FIG. 6 is a schematic side view illustration of a secondary barrier system including a secondary barrier gate according to another embodiment of the present disclosure.

DETAILED DESCRIPTION

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Figure 1:
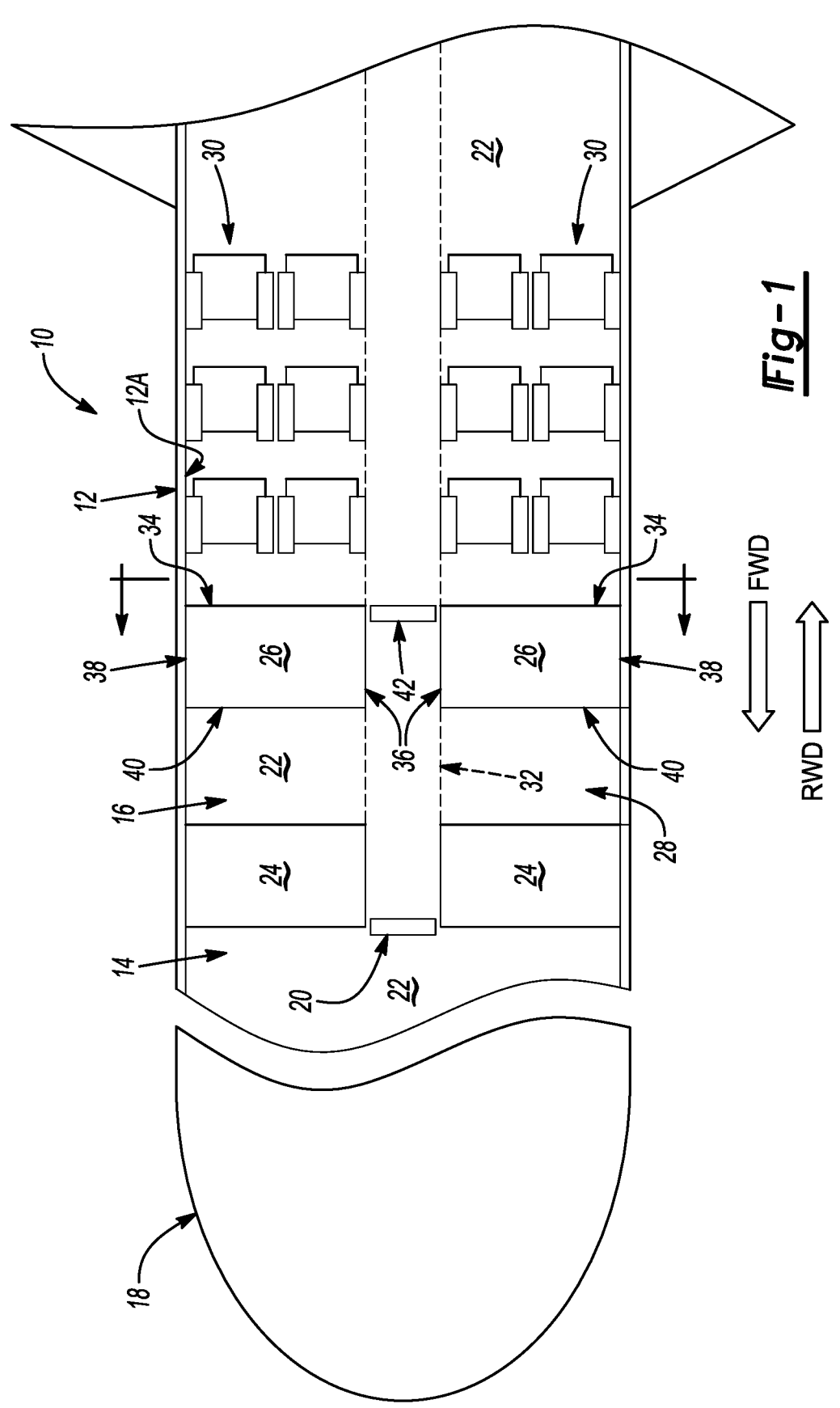
FIG. 1 is a schematic plan view illustration of a section of an aircraft including a secondary barrier system.

With reference to FIG. 1, a section of an aircraft 10 is shown. The aircraft 10 includes a fuselage 12 having a flight deck 14, a main cabin 16, and a nose 18. A forward direction FWD in the aircraft 10 may be defined as in a direction toward the nose 18, while a rearward direction RWD in the aircraft 10 may be defined as in a direction away from the nose 18. As such, the flight deck 14 extends forward in the aircraft 10 from a flight deck door 20 toward the nose 18 and the main cabin 16 extends rearward in the aircraft 10 from the flight deck door 20.

A floor 22 is located inside the fuselage 12 of the aircraft 10. A first set of monuments 24 and a second set of monuments 26 are located in the main cabin 16, along an inside wall 12A of the fuselage 12, and rearward of the flight deck 14. The first set of monuments 24 are coupled to the floor 22 and extend rearward from the flight deck 14 into the main cabin 16. The second set of monuments 26 are coupled to the floor 22, rearward of the first set of monuments 24, and extend rearward into the main cabin 16. A main entrance door (not shown) to the aircraft 10 is located in an opening 28 in the fuselage 12. The opening 28 is located between one of the first set of monuments 24 and one of the second set of monuments 26, corresponding to the one of the first set of monuments 24.

A plurality of seats 30 are located in the main cabin 16, rearward of the opening 28, and the second set of monuments 26. An aisle 32 is defined by the first set of monuments 24, the second set of monuments 26, and the plurality of seats 30.

The flight deck door 20 is located in the fuselage 12, between the flight deck 14 and the main cabin 16, and disposed between the first set of monuments 24. The flight deck door 20 is securable to prevent access to the flight deck 14 from the main cabin 16. Each of the second set of monuments 26 includes a main cabin wall 34, an aisle wall 36, a fuselage wall 38, and a flight deck wall 40. A secondary barrier 42 is located in the fuselage 12 of the aircraft 10, between the aisle walls 36 of the second set of monuments 26.

Figure 2:
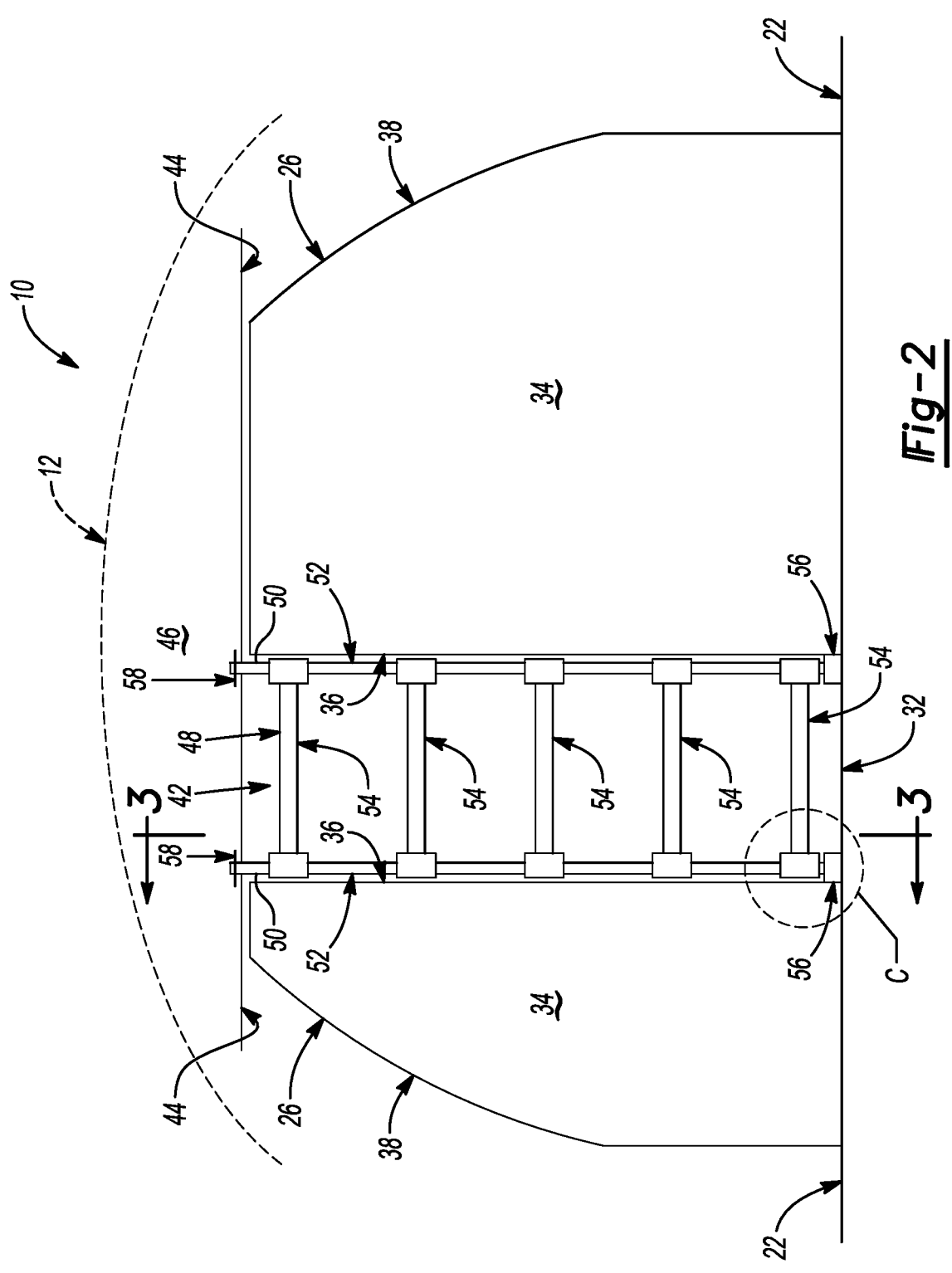
FIG. 2 is a schematic sectional view illustration of the interior of the aircraft of FIG. 1 including a front view of a secondary barrier system in a deployed position.

With reference to FIG. 2, an interior of the fuselage 12 of the aircraft 10 illustrated in FIG. 1, includes a floor 22, a ceiling 44 opposite the floor 22, and a second set of monuments 26. A crown area 46 of the aircraft 10 is located in the fuselage, schematically illustrated at 12, between the fuselage 12 and the ceiling 44 of the aircraft 10. Each of the second set of monuments 26 includes a main cabin wall 34, an aisle wall 36, a fuselage wall 38, and a flight deck wall 40 (FIG. 1). Each of the second set of monuments 26 are coupled to the floor 22 and extend vertically from the floor 22 to the ceiling 44. Each of the second set of monuments 26 extends inward from the interior wall 12A of the fuselage 12 (FIG. 1) toward an aisle 32 extending between respective aisle walls 36 of each of the second set of monuments 26.

Figure 3:
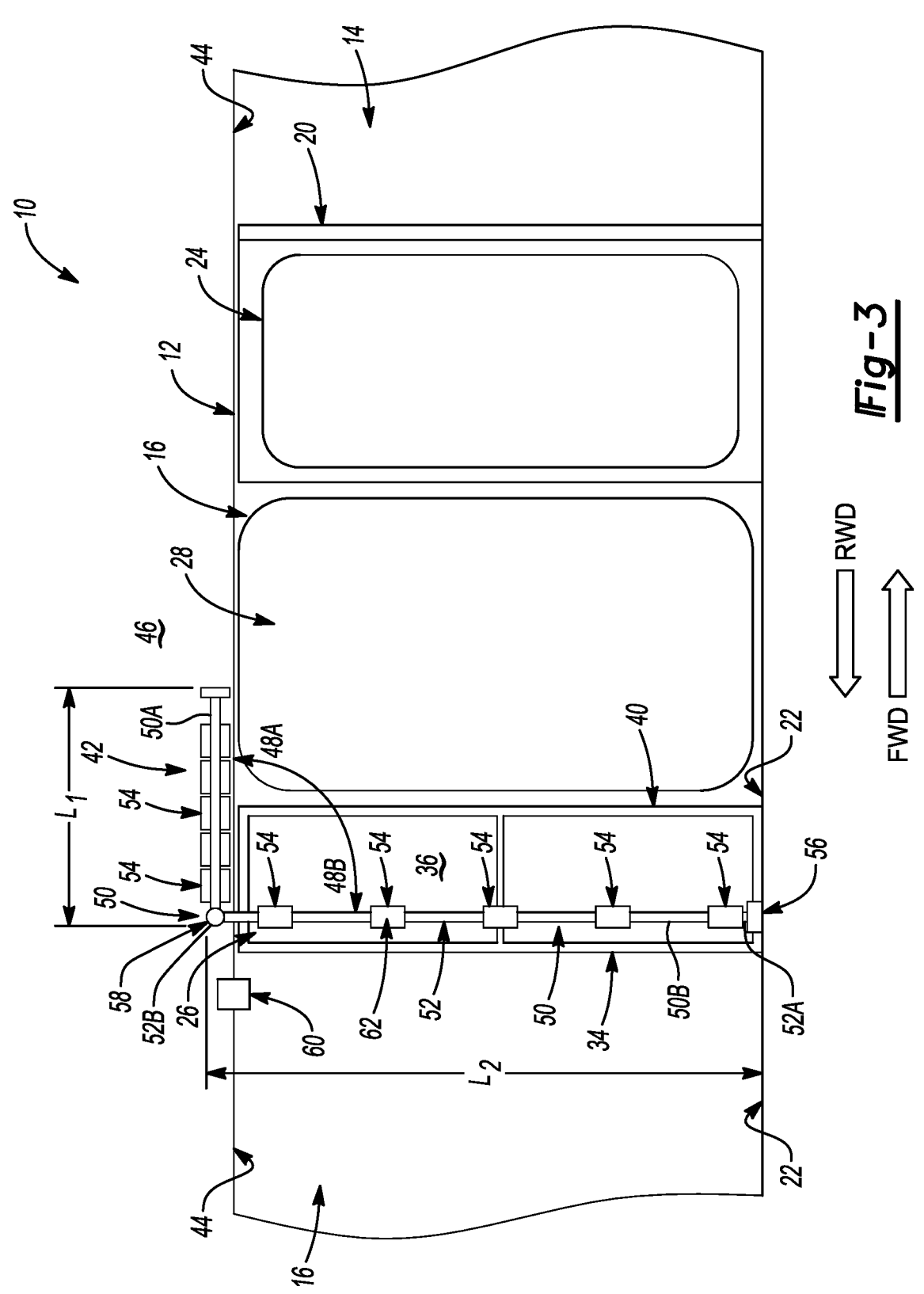
FIG. 3 is a schematic sectional side view illustration of FIG. 1 including a side view of a secondary barrier system in a deployed position.

A secondary barrier 42 includes a secondary barrier gate 48 having a telescoping structure 50, which is extendable between a retracted position 50A and an extended position 50B, as illustrated in FIG. 3. The secondary barrier 42, which may be deployed between the flight deck 14 and the main cabin 16 of the aircraft 10 during a door transition to block access to the flight deck door 20 from the main cabin 16, corresponds with the aisle 32 of the aircraft 10, and operable to provide a secondary barrier in compliance with FAA regulatory requirements. The secondary barrier gate 48 may be constructed of a rigid material, for example, but not limited to a metal, such as aluminum or other, preferably lightweight, structural material. While the aircraft 10, as illustrated, includes a single aisle 32, it should be appreciated that the aircraft 10 may include more than a single aisle 32 and a secondary barrier 42 may be included for each aisle 32 included in the aircraft 10.

The telescoping structure 50 includes telescoping legs 52 and a plurality of crossmembers 54 extending between the telescoping legs 52. The plurality of crossmembers 54 may be located in relation to one another to provide clear visibility through the secondary barrier gate 48 to facilitate crew member situational awareness.

The telescoping structure 50 is illustrated in the extended position 50B. One of the telescoping legs 52 is adjacent to an aisle wall 36 of one monument of the second set of monuments 26, while the other of the telescoping legs 52 is adjacent to an aisle wall 36 of the other monument of the second set of monuments 26, when the secondary barrier gate 48 is in the deployed position 48B.

Each of the telescoping legs 52 includes foot portion 56 located at a first end 52A of each of the telescoping legs 52. While the foot portion 56 is illustrated as being included with each of the telescoping legs 52, it should be appreciated that the foot portion 56 could be included with only one of the telescoping legs 52 of the telescoping structure 50.

The secondary barrier gate 48 is pivotably mounted in relation to the ceiling 44 and rotatable between a stowed position 48A and a deployed position 48B (FIG. 3). In the illustrated embodiment, the secondary barrier gate 48 is pivotably mounted to the ceiling 44 at pivots 58, located at second ends 52B of each of the telescoping legs 52. While the secondary barrier gate 48 is illustrated as being mounted to the ceiling 44, it should be appreciated that the secondary barrier gate 48 may be pivotably mounted within the crown area 46 of the aircraft 10, as illustrated in FIG. 3.

With reference to FIG. 3 and continued reference to FIG. 1, an interior of a fuselage 12 of an aircraft 10 includes a flight deck 14, a main cabin 16, and a nose 18. A forward direction FWD in the aircraft 10 may be defined as in a direction toward the nose 18, while a rearward direction RWD in the aircraft 10 may be defined as in a direction away from the nose 18. As such, the flight deck 14 extends forward in the aircraft 10 from a flight deck door 20 toward the nose 18 and the main cabin 16 extends rearward in the aircraft 10 from the flight deck door 20.

A secondary barrier gate 48, is pivotably mounted within a crown area 46 of the aircraft 10 at pivots 58. The secondary barrier gate 48 is pivotable between a deployed position 48B, wherein the secondary barrier gate 48 is substantially perpendicular to a floor 22, and a stowed position 48A, wherein the secondary barrier gate 48 is substantially parallel to the floor 22. When the secondary barrier gate 48 is in the deployed position 48B, the secondary barrier gate 48 blocks access to the flight deck door 20 from the main cabin 16.

A stowage latch, schematically illustrated at 60, may be but is not limited to being located in the ceiling 44, proximate to the secondary barrier gate 48. The stowage latch 60, which is actuatable between a stowed position and a released position, may be actuated by a crew member to selectively secure the secondary barrier gate 48 in the stowed position 48A and release the secondary barrier gate 48 from the stowed position 48A. While the stowage latch 60 is illustrated as being located in the ceiling 44, it should be appreciated that the stowage latch 60 may be located at a location proximate to the secondary barrier gate 48, such that the stowage latch 60 is in operable engagement with the secondary barrier gate 48.

Upon selective actuation of the stowage latch 60 by a crew member, the secondary barrier gate 48 is released from the stowed position 48A, and pivoted from the stowed position 48A, substantially parallel to the floor 22 of the aircraft 10, to the deployed position 48B, substantially perpendicular to the floor 22 of the aircraft 10, in a controlled deployment by the crew member.

The secondary barrier gate 48 includes a telescoping structure 50, which is extendable from a retracted position 50A to an extended position 50B. When the telescoping structure 50 is in the retracted position 50A, the secondary barrier gate 48 has a retracted length L1. When the telescoping structure 50 is in the extended position 50B, the secondary barrier gate 48 has an extended length L2, which is longer than the retracted length L1.

A deployment latch, schematically illustrated at 62, is located on secondary barrier gate 48, more specifically, in the illustrated embodiment, on the telescoping structure 50 of the secondary barrier gate 48. The deployment latch 62 is actuatable to selectively release the telescoping structure 50 from the retracted position 50A or the extended position 50B, and/or secure the telescoping structure 50 in the retracted position 50A or the extended position 50B. The deployment latch 62 may be actuated by a crew member to selectively release the telescoping structure 50 from the retracted position 50A and secure the telescoping structure 50 in the retracted position 50A. The deployment latch 62 may also be actuated by the crew member to selectively release the secondary barrier gate from an extended position 50B and secure the secondary barrier gate in the extended position 50B.

Accordingly, when the telescoping structure 50 is in the retracted position 50A, the secondary barrier gate 48 has the retracted length L1. When the telescoping structure 50 is in the extended position 50B, the secondary barrier gate has the extended length L2.

Upon selective actuation of the deployment latch 62 by a crew member, preferably when the secondary barrier gate reaches a near vertical orientation, the telescoping structure 50 of the secondary barrier gate 48, is released from the retracted position 50A, and extended, by the crew member, to the extended position 50B.

Once the telescoping structure 50 is in the extended position 50B, the deployment latch 62, is selectively actuated by the crew member to secure the telescoping structure 50 in the extended position 50B.

Once the deployment latch 62 has been selectively actuated, while the telescoping structure 50 is free to be extended and/or retracted, the secondary barrier gate 48 may be prevented from rotating.

While the deployment latch 62 is illustrated as being located on the telescoping structure 50, it should be appreciated that the deployment latch 62 may be located at a location proximate to the telescoping structure 50, such that the deployment latch 62 is in operable engagement with the telescoping structure 50.

In the illustrated embodiment, the foot portion 56 includes a compressible foot pad. When the telescoping structure 50 is in the extended position 50B, the compressible foot pad 56 is compressed to secure the secondary barrier gate 48 in the deployed position 48B, until released by a crew member.

Figures 4A, 4B:
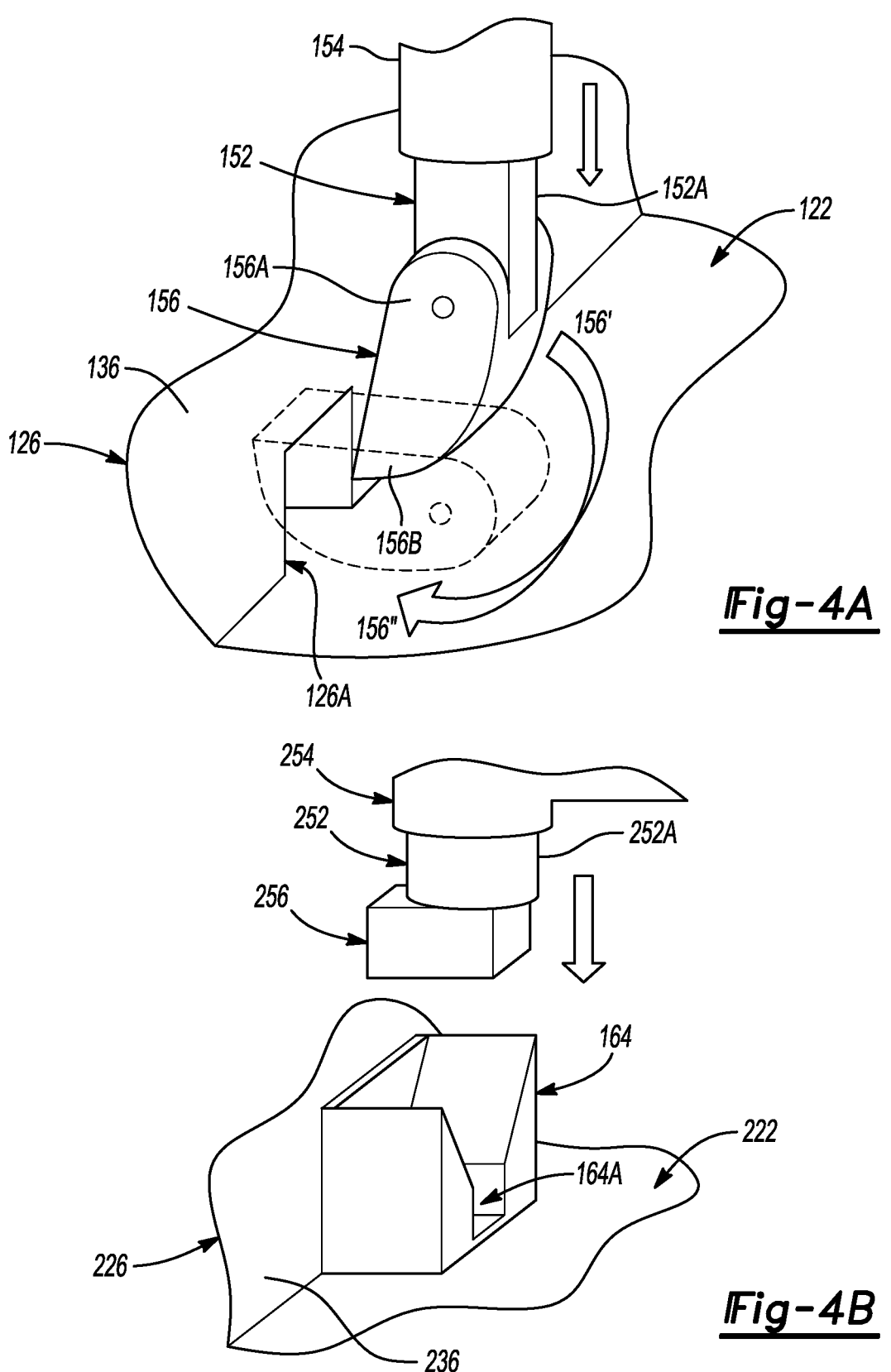
FIG. 4A is a schematic exploded view illustration of a portion of a secondary barrier system encircled at C in FIG. 2, according to one embodiment of the present disclosure.
FIG. 4B is a schematic exploded view illustration of a portion of a secondary barrier system encircled at C in FIG. 2, according to another embodiment of the present disclosure.

In another embodiment, as illustrated in FIG. 4A, with continued reference to FIG. 2, a secondary barrier gate 48 includes a foot portion 156 that includes a pivot foot 156. A monument 126, which is attached to at least one of a floor 122 and a aisle wall 136, includes a monument cutout 126A. The pivot foot 156 includes a pivot portion 156A and an end portion 156B. The pivot portion 156A of the pivot foot 156 is pivotably attached to a first end 152A of at least one of the telescoping legs 152 and extends below at least one of a plurality of crossmembers 154. The pivot foot 156 is rotatable between a first position 156' and a second position 156''. An aisle wall 136 of the monument 126 includes the monument cutout 126A. When the pivot foot 156 is rotated to the second position 156'', the end portion 156B of the pivot foot 156 engages with the monument cutout 126A to secure the secondary barrier gate 48 in the deployed position 48B (FIG. 2). When the secondary barrier gate 48 is secured in the deployed position 48B, the secondary barrier gate 48 blocks the aisle 32, preventing access to the flight deck 14 from the main cabin 16 (FIG. 2).

In another embodiment, as illustrated in FIG. 4B, with continued reference to FIG. 2, a secondary barrier gate 48 includes a foot portion 256 that includes a fixed foot 256. The fixed foot 256 is fixedly attached to a first end 252A of at least one of the telescoping legs 252 and extends below at least one of a plurality of crossmembers 254. A stabilizer block 164, including a stabilizer block cutout 164A, is fixedly attached to a floor 222 of the aircraft 10. The stabilizer block cutout 164A is configured to receive the fixed foot 256 attached to the telescoping leg 252 when the telescoping structure 50 is in the extended position 50B and secure the secondary barrier gate 48 in the deployed position 48B (FIG. 2). While the stabilizer block 164 is illustrated as being fixedly attached to the floor 222, it should be appreciated that the stabilizer block 164 may be fixedly attached to an aisle wall 236 of a second monument 226, and/or fixedly attached to both the floor 222 and the aisle wall 236 of the second monument 226.

In another embodiment, as illustrated in FIG. 4C, with continued reference to FIG. 2, a secondary barrier gate 48 includes a foot portion 356 having a fixed foot 356 that is integral to a telescoping leg 352 and extends below at least one of a plurality of crossmembers 354. A monument 326 includes an aisle wall 336. A floor 322 defines an opening 366 that extends into the floor 322. The opening 366 is configured to receive the fixed foot 356 attached to the telescoping leg 352 when the secondary barrier gate 48 is in the deployed position 48B (FIG. 2). While the fixed foot 356 is illustrated as being integral to the telescoping leg 352, it should be appreciated that the fixed foot 356 may be separate from the telescoping leg 352, and fixedly attached to a first end 352A of the telescoping leg 352, such that the fixed foot 356 is configured to be received within the opening 366 of the floor 322 of the aircraft 10.

With reference to FIG. 5 and continued reference to FIG. 3, a secondary barrier gate 448 is pivotably mounted within an opening 468 in a ceiling 444 of the main cabin 416 of the aircraft 10 at pivots 458. The secondary barrier gate 448 is pivotable between a deployed position 448B, wherein the secondary gate is substantially perpendicular to a floor 422, and a stowed position 448A, wherein the secondary barrier gate 448 is substantially parallel to the floor 422.

When the secondary barrier gate 448 is in the deployed position 448B, the secondary barrier gate 448 is adjacent to an aisle wall 436 of a monument 426. When the secondary barrier gate 448 is in the stowed position 448A, the secondary barrier gate 448 is within a crown area 446 of the aircraft 10, located above the ceiling 444 and within the fuselage 412 of the aircraft 10.

The secondary barrier gate 448 includes a telescoping structure 450, which is extendable from a retracted position 450A to an extended position 450B. When the telescoping structure 450 is in the retracted position 450A, the secondary barrier gate 448 has a retracted length L1. When the telescoping structure 450 is in the extended position 450B, the secondary barrier gate 448 has an extended length L2, which is longer than the retracted length L1.

The telescoping structure 450 includes telescoping legs 452 having a first end 452A and a second end 452B, and a plurality of crossmembers 454 extending between the telescoping legs 452.

At least one of the plurality of crossmembers 454 includes a panel treatment 470.

In the illustrated embodiment, each of the plurality of crossmembers 454 includes a panel treatment 470. When the secondary barrier gate 448 is in the deployed position 448B, the telescoping structure 450, including the plurality of crossmembers 454, is in the extended position 450B. When the telescoping structure 450 is in the extended position 450B, the plurality of crossmembers 454 including panel treatments 470, may be located in relation to one another to provide clear visibility through the secondary barrier gate 448 to facilitate crew member situational awareness when the secondary barrier gate 448 is in the deployed position 448B.

When the secondary barrier gate 448 is in the stowed position 448A and the telescoping structure 450, including the plurality of crossmembers 454, is in the retracted position 450A, the panel treatments 470 engage with one another to form a ceiling panel 470' disposed within the opening 468 in the ceiling 444. The ceiling panel 470' is disposed within the opening 468 in the ceiling 444 of the aircraft 10 when the secondary barrier gate 448 is in the stowed position 548A to substantially obscure the secondary barrier gate 448 from view.

With reference to FIG. 6, and continued reference to FIG. 1, a secondary barrier system 542 including a secondary barrier gate 548 for an aircraft 10 is disclosed. The secondary barrier gate 548 is rotatably mounted at pivot 558 within a crown area 546 above a ceiling and within a fuselage 512 of the aircraft 10. The secondary barrier gate 548 is pivotable between a stowed position 548 A, at least one intermediate position 548A', and a deployed position 548B.

The secondary barrier gate 548 includes a telescoping structure 550 and a foot portion 556, which is illustrated as a compressible foot 556. The secondary barrier gate 548 is extendable between a retracted length L1, when the secondary barrier gate 548 is in the stowed position 548A and the at least one intermediate position 548A', and an extended length L2, when the secondary barrier gate 548 is in the deployed position 548B.

The secondary barrier gate 548 is rotatable about the pivot 558, no more than $\Theta_{max}$ degrees, between a stowed position 548A, substantially parallel to a floor 522 of the aircraft 10, and a deployed position 548B, wherein $\Theta_{max}$ is preferably 105 degrees, to compress the compressible foot 556. The secondary barrier gate 548 rotates between the stowed position 548A and the deployed position 548B through an opening 568 in the ceiling 544 of the aircraft 10.

Figures 6A, 6B:
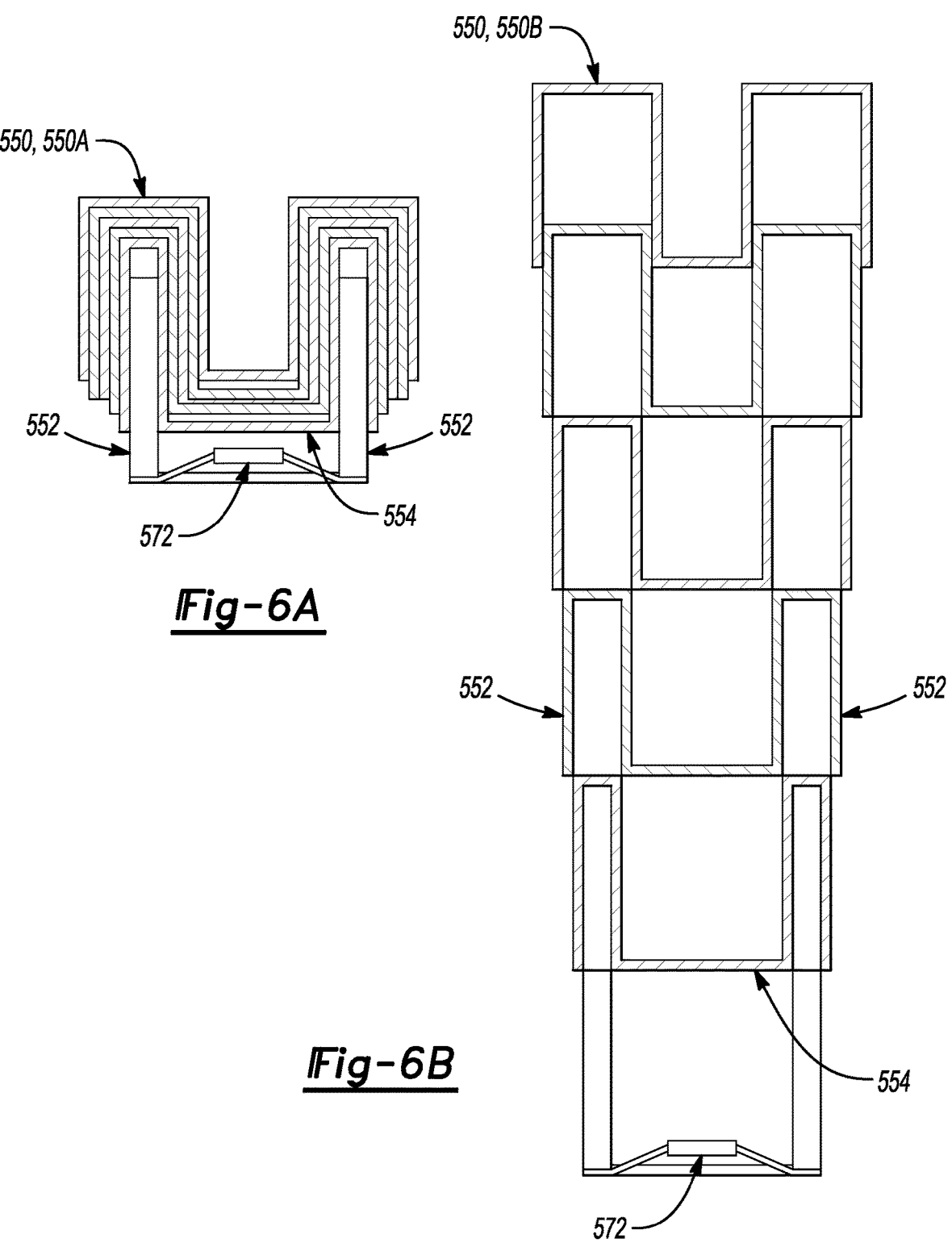
FIG. 6A is a schematic illustration of a secondary barrier gate of FIG. 6 retracted.
FIG. 6B is a schematic illustration of a secondary barrier gate of FIG. 6 extended.

As illustrated in FIG. 6A, a secondary barrier gate 548 includes a telescoping structure 550 in a retracted position 550A. A handle 72 may be included to facilitate extension of the telescoping structure 550 from the retracted position 550A to the extended position 550B (FIG. 6B).

As illustrated in FIG. 6B, a secondary barrier gate 548 includes a telescoping structure 550 in an extended position 550B. A handle 572 may be included to facilitate retraction of the telescoping structure 550 from the extended position 550B (FIG. 6A) to the retracted position 550A.

The telescoping structure 550, illustrated in FIGS. 6A and 6B, includes telescoping legs 552 and a plurality of cross-members 554 extending between the telescoping legs 552. At least one of the telescoping legs 552 includes a foot portion 556.

In the illustrated embodiment, the foot portion 556 includes a compressible foot pad that, when compressed, secures the secondary barrier gate 548 in the deployed position 548B.

The secondary barrier gate 548 is disposed within a stowage box 574 and may include a stowage panel 576. The stowage box 574 is located within a crown area of the aircraft 10. The secondary barrier gate 548 is pivotably mounted within the stowage box 574. The stowage panel 576 is disposed within the opening 568 in the ceiling of the aircraft 10 when the secondary barrier gate 548 is in the stowed position 548A to substantially obscure the secondary barrier gate 548 from view.

It should be appreciated that, while some disclosed embodiments may lend themselves to being installed during the initial build of an aircraft by an original manufacturer, other embodiments may be utilized by the original manufacturers and third-parties, such as retro-fit companies, to retro-fit existing aircraft.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to", "operative to," and/or as being "operable to" perform that function.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

What is claimed is:

1. A secondary barrier configured to extend across an opening within an interior of an aircraft with the opening formed between structural members of the aircraft, the secondary barrier comprising:

a secondary barrier gate positioned at the opening and movable between an extended position to extend across the opening and a retracted position away from the opening, the secondary barrier gate comprising:

a first leg and a second leg spaced apart by a gap, each of the first leg and the second leg comprising a plurality of telescoping members that are movable between an extended configuration sized to extend along the opening and a nested configuration;

crossmembers that are connected to each of the first leg and the second leg and sized to extend across a width of the gap;

feet positioned at a distal end of the first leg and the second leg;

mounts to connect the secondary barrier gate at the opening within the interior of the aircraft, the mounts configured to move the secondary barrier gate between a deployed position at the opening and a stowed position away from the opening;

wherein in the extended position the secondary barrier gate has a first height to extend along a height of the opening between a top side and a bottom side of the opening and with the telescoping members spaced apart; and wherein in the retracted position the telescoping members are nested together and having a second height that is less than the first height.

2. The secondary barrier as recited in claim 1, wherein each of the feet comprises a foot portion with a compressible foot pad.

3. The secondary barrier as recited in claim 2, wherein each of the compressible foot pads are configured to be compressed to secure the secondary barrier gate in the deployed position.

4. The secondary barrier as recited in claim 2, comprising a monument cutout, wherein the foot portion comprises a pivot foot that is rotatable between a first position and a second position, wherein, when the pivot foot is rotated to the second position, the pivot foot engages with the monument cutout to secure the secondary barrier gate in the deployed position.

5. The secondary barrier as recited in claim 2, comprising a stabilizer block having a stabilizer block cutout, wherein the foot portion comprises a fixed foot that is engageable with the stabilizer block cutout to secure the secondary barrier gate in the extended position.

6. The secondary barrier as recited in claim 5, wherein the stabilizer block is mounted to at least one of a monument or a floor of the aircraft.

7. The secondary barrier as recited in claim 2, wherein a floor defines at least one opening, and the foot portion comprises a fixed foot engageable with the at least one opening to secure the secondary barrier in the extended position.

8. The secondary barrier as recited in claim 1, wherein the first telescoping leg is adjacent a first monument wall and the second telescoping leg is adjacent a second monument wall, when the secondary barrier gate is in the extended position.

9. The secondary barrier as recited in claim 1, further comprising a plurality of panel treatments with each of the panel treatments connected to one of the plurality of crossmembers with the panel treatments comprising a body that extends outward beyond the crossmember for adjacent ones of the panel treatments to be spaced apart along the height of the opening in the extended position and to be positioned in closer proximity in the retracted position.

10. The secondary barrier as recited in claim 1, comprising a stowage latch actuatable to selectively release the secondary barrier gate from a stowed position when in the retracted position and secure the secondary barrier gate in the stowed position.

11. The secondary barrier as recited in claim 1, comprising a deployment latch actuatable to selectively release the secondary barrier gate from one of the retracted position and/or the extended position, and/or secure the secondary barrier gate at one of the retracted position and/or the extended position.

12. The secondary barrier as recited in claim 1, wherein the secondary barrier gate is rotatably mounted to a ceiling of the aircraft.

13. The secondary barrier as recited in claim 1, wherein the secondary barrier gate is rotatably mounted within a crown area of the aircraft.

14. The secondary barrier as recited in claim 1, wherein the secondary barrier gate is disposed in a stowage box, wherein the stowage box is located within a crown area of the aircraft.

15. A secondary barrier configured to extend across an opening within an interior of an aircraft with the opening formed between a ceiling, a floor, and opposing lateral side walls, the secondary barrier comprising:

a secondary barrier gate movable between an extended position and a retracted position, the secondary barrier gate comprising:
   outer legs comprising a plurality of telescoping members, the outer legs comprising a top end and a bottom end, the outer legs configured to be positioned between the extended position with the telescoping members extended outward and the retracted position with the telescoping members nested together;
   crossmembers that extend between and are connected to the outer legs;
mounts that connect the top ends of the outer legs to the ceiling of the aircraft, the mounts configured to pivotably position the secondary barrier gate between a deployed position and a stowed position;
wherein in the extended position and in the deployed position, the outer legs extend along the height of the opening between the ceiling and the floor and the crossmembers are spaced apart along the height and extend across a width of the opening between the lateral side walls to block the opening; and
wherein in the retracted position the stowed position, the outer telescoping members are nested together and the crossmembers are positioned together and the secondary barrier gate is positioned to enable persons to move through the opening.

16. The secondary barrier of claim 15, wherein the mounts are configured to position the secondary barrier gate substantially perpendicular to the floor in the deployed position and substantially parallel to the floor in the stowed position.

17. The secondary barrier of claim 15, further comprising feet positioned at a distal end of the outer legs, each of the feet comprises a compressible foot pad that is compressed against the floor in the extended and deployed positions.

18. The secondary barrier of claim 15, further comprising panel treatments connected to the crossmembers, the panel treatments being wider than the crossmembers and being spaced apart along the height of the opening in the extended and deployed positions.

19. The secondary barrier of claim 18, wherein the panel treatments are positioned on opposing front and rear sides of the crossmembers along the height of the opening.

20. The secondary barrier gate of claim 15, wherein the secondary barrier gate is rotatably mounted within a crown area of the aircraft.

* * * * *